United States Patent
Chou et al.

(10) Patent No.: US 8,000,023 B2
(45) Date of Patent: Aug. 16, 2011

(54) ZOOM LENS

(75) Inventors: Yu-Hung Chou, Hsinchu (TW);
Yuan-Long Cai, Hsinchu (TW);
Chien-Hsiung Tseng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 45 days.

(21) Appl. No.: 12/647,981

(22) Filed: Dec. 28, 2009

(65) Prior Publication Data

US 2011/0157710 A1 Jun. 30, 2011

(51) Int. Cl.
*G02B 15/00* (2006.01)
*G02B 15/14* (2006.01)

(52) U.S. Cl. ...................................................... 359/680

(58) Field of Classification Search .......... 359/680–682; 396/72–88; 348/240.99–240.3, 335–369
See application file for complete search history.

(56) References Cited

U.S. PATENT DOCUMENTS

| | | | |
|---|---|---|---|
| 4,364,641 A * | 12/1982 | Mogami | 359/680 |
| 6,137,638 A | 10/2000 | Yamagishi et al. | |
| 6,147,812 A | 11/2000 | Narimatsu et al. | |
| 6,441,967 B2 * | 8/2002 | Furuta | 359/684 |
| 6,738,196 B2 | 5/2004 | Yamamoto | |
| 6,894,845 B2 | 5/2005 | Narimatsu et al. | |
| 6,906,867 B2 | 6/2005 | Nagata | |
| 7,061,688 B2 | 6/2006 | Sato et al. | |

FOREIGN PATENT DOCUMENTS

| | | |
|---|---|---|
| TW | M281179 | 11/2005 |
| TW | I288290 | 10/2007 |

* cited by examiner

*Primary Examiner* — Darryl J Collins
(74) *Attorney, Agent, or Firm* — J.C. Patents

(57) ABSTRACT

A zoom lens including a first lens group and a second lens group arranged in sequence from a magnified side toward a reduced side is provided. The first lens group has a negative refractive power and includes a first lens, a second lens, a third lens, and a fourth lens arranged in sequence from the magnified side toward the reduced side, of which the refractive powers are respectively positive, negative, negative, and positive. The second lens group has a positive refractive power and includes a fifth lens, a sixth lens, a seventh lens, an eighth lens, a ninth lens, a tenth lens, and an eleventh lens arranged in sequence from the magnified side toward the reduced side, of which the refractive powers are respectively positive, negative, positive, negative, positive, negative, and positive. The eighth lens, the ninth lens, and the tenth lens together form a triple cemented lens.

8 Claims, 6 Drawing Sheets

ZOOM LENS

BACKGROUND OF THE INVENTION

1. Field of the Invention

The invention generally relates to a lens, and more particularly, to a zoom lens.

2. Description of Related Art

The zoom lens is a common optical component of an optical system, which may be used in a wide variety of applications including digital cameras, back projection televisions, projectors, or the like. In general zoom lenses, aspheric lenses are used for reducing the total number of the lenses in a zoom lens, such as U.S. Pat. Nos. 6,738,196, 7,061,688, and 6,147,812. However, the aspheric lenses have little tolerance, thereby increasing the difficulty in fabrication and assembly. Moreover, the aspheric lenses have larger cost. Other zoom lenses adopt more zooming lens groups for reducing the total number of the lenses in a zoom lens, and avoid using aspheric lenses, such as U.S. Pat. Nos. 6,906,867, 6,894,845, and 6,137,638. However, the more the zooming lens groups are, the larger the cost of the zoom lens is.

Taiwan Patent No. M281179 discloses a zoom lens in FIG. 2B. The zoom lens has ten lenses, and includes a first lens group having a negative refractive power and a second lens group having a positive refractive power. The first lens group is composed of four lenses, and the four lenses respectively have positive, negative, negative, and positive refractive powers. The second lens group is composed of six lenses. In addition, Taiwan Patent No. I288290 discloses a zoom lens in FIG. 1. The zoom lens has eleven lenses and includes a first lens group having a negative refractive power and a second lens group having a positive refractive power. The first lens group is composed of four lenses, and the second lens group is composed of seven lenses.

SUMMARY OF THE INVENTION

Accordingly, the invention is directed to a zoom lens, which has at least one of lower cost and lower difficulty in fabrication and assembly.

An embodiment of the invention provides a zoom lens adapted to be disposed between a magnified side and a reduced side. The zoom lens includes a first lens group and a second lens group. The first lens group is disposed between the magnified side and the reduced side and has a negative refractive power. The first lens group includes a first lens, a second lens, a third lens, and a fourth lens arranged in sequence from the magnified side toward the reduced side. The refractive powers of the first lens, the second lens, the third lens, and the fourth lens are respectively positive, negative, negative, and positive. The second lens group is disposed between the first lens group and the reduced side and has a positive refractive power. The second lens group includes a fifth lens, a sixth lens, a seventh lens, an eighth lens, a ninth lens, a tenth lens, and an eleventh lens arranged in sequence from the magnified side toward the reduced side. The refractive powers of the fifth lens, the sixth lens, the seventh lens, the eighth lens, the ninth lens, the tenth lens, and the eleventh lens are respectively positive, negative, positive, negative, positive, negative, and positive. The eighth lens, the ninth lens, and the tenth lens together form a triple cemented lens.

The embodiment or the embodiments of the invention may have at least one of the following advantages, in the zoom lens according to the embodiment of the invention, two lens groups and eleven lenses are used, which effectively reduces the cost of the lenses and the mechanisms in the zoom lenses and reduces the difficulty in fabricating lenses and assembling lenses.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
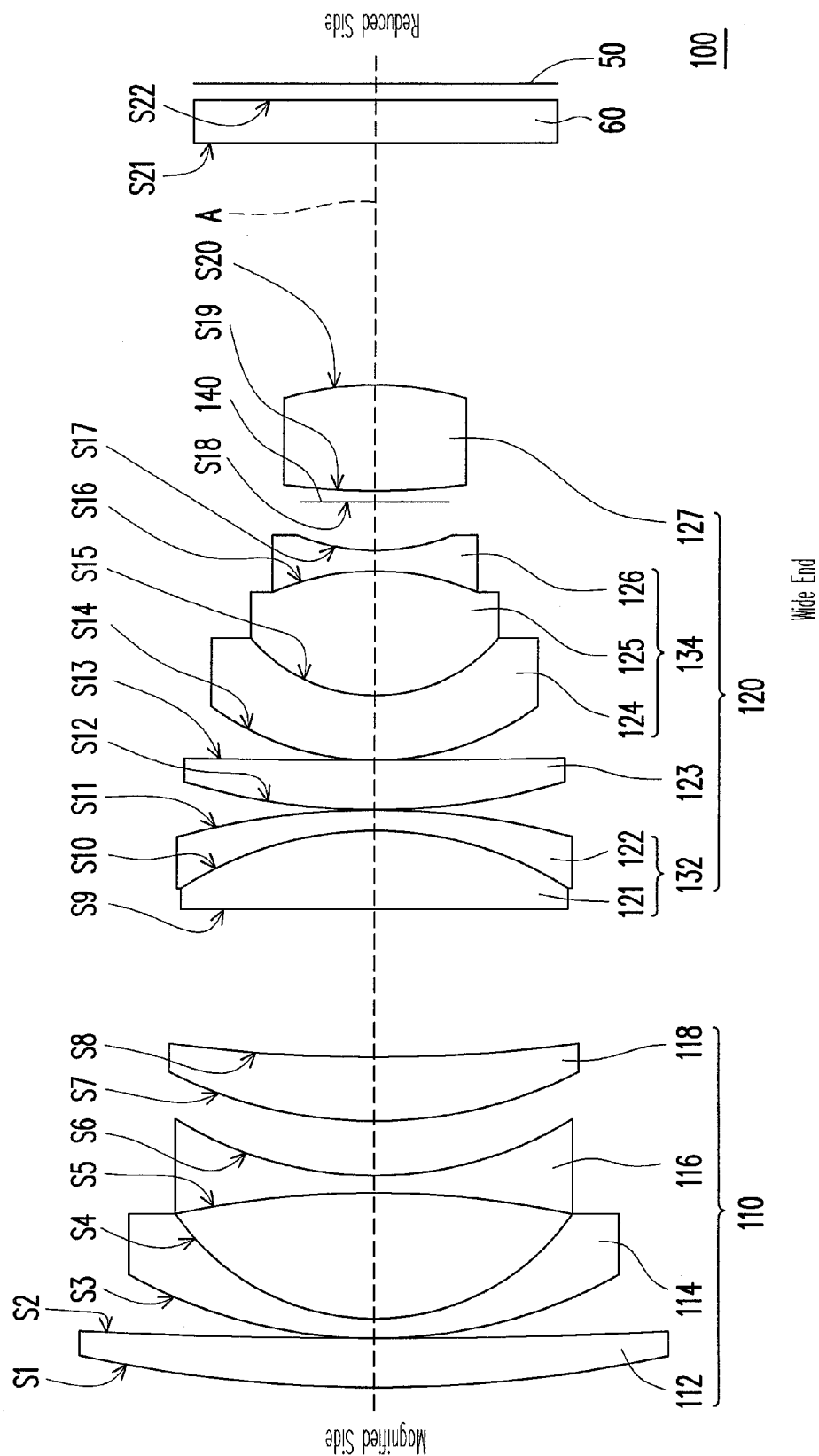
FIG. 1A is the schematic view of a zoom lens according to an embodiment of the invention at a wide end.
Figure 1B:
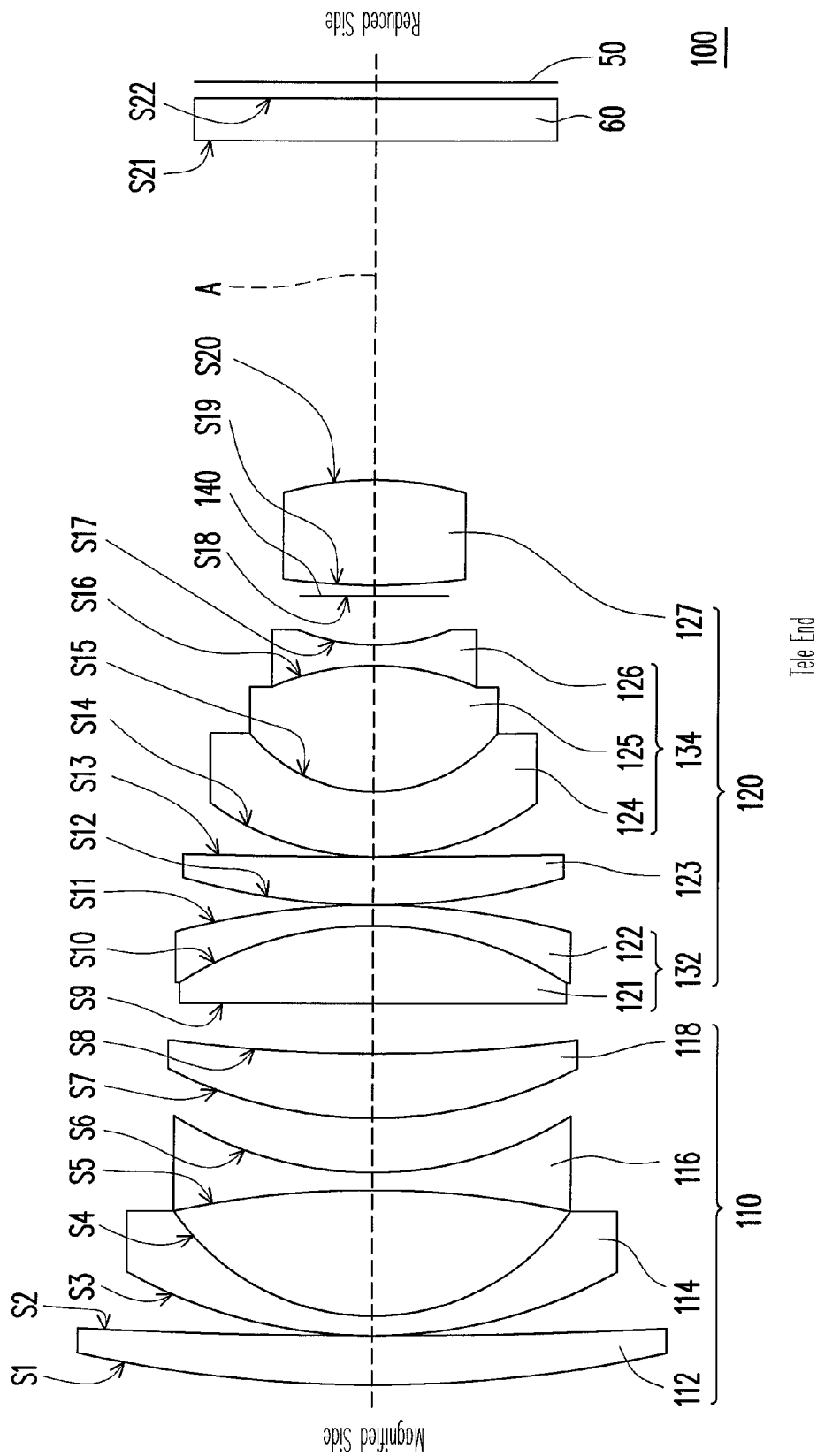
FIG. 1B is the schematic view of the zoom lens of FIG. 1A at a tele end.

FIG. 1A is the schematic view of a zoom lens according to an embodiment of the invention at a wide end, and FIG. 1B is the schematic view of the zoom lens of FIG. 1A at a tele end. Referring to FIGS. 1A and 1B, the zoom lens 100 of this embodiment is adapted to be disposed between a magnified side and a reduced side. In this embodiment, the zoom lens 100 is adapted to a projection apparatus (not shown), and capable of projecting an image formed by a light valve 50 of the projection apparatus at the reduced side onto a screen (not shown) at the magnified side. The light valve 50 is, for example, a digital micro-mirror device (DMD), a liquid-crystal-on-silicon (LCOS) panel, or a transmissive liquid crystal panel. The zoom lens 100 includes a first lens group 110 and a second lens group 120. The first lens group 110 is disposed between the magnified side and the reduced side and has a negative refractive power. The first lens group 110 includes a first lens 112, a second lens 114, a third lens 116, and a fourth lens 118 arranged in sequence from the magnified side toward the reduced side. The refractive powers of the first lens 112, the second lens 114, the third lens 116, and the fourth lens 118 are respectively positive, negative, negative, and positive. The second lens group 120 is disposed between the first lens group 110 and the reduced side and has a positive refractive power. The second lens group 120 includes a fifth lens 121, a sixth lens 122, a seventh lens 123, an eighth lens 124, a ninth lens 125, a tenth lens 126, and an eleventh lens 127 arranged in sequence from the magnified side toward the reduced side. The refractive powers of the fifth lens 121, the sixth lens 122, the seventh lens 123, the eighth lens 124, the ninth lens 125, the tenth lens 126, and the eleventh lens 127 are respectively positive, negative, positive, negative, positive, negative, and positive. The eighth lens 124, the ninth lens 125, and the tenth lens 126 together form a triple cemented lens 134. In this embodiment, the fifth lens 121 and the sixth lens 122 together form a double cemented lens 132.

In this embodiment, the zoom lens 100 further includes an aperture stop 140 disposed between the tenth lens 126 and the eleventh lens 127. In this embodiment, the first lens 112 is a concave-convex lens with a convex surface facing the magnified side, the second lens 114 is a convex-concave lens with a convex surface facing the magnified side, the third lens 116 is a biconcave lens, and the fourth lens 118 is a concave-convex lens with a convex surface facing the magnified side, for example. Moreover, in this embodiment, the fifth lens 121 is a plane-convex lens with a plane surface facing the magnified side, the sixth lens 122 is a convex-concave lens with a concave surface facing the magnified side, the seventh lens 123 is a plane-convex lens with a convex surface facing the magnified side, the eighth lens 124 is a convex-concave lens with a convex surface facing the magnified side, the ninth lens 125 is a biconvex lens, the tenth lens 126 is a biconcave lens, and the eleventh lens 127 is a biconvex lens, for example. In this embodiment, the eleventh lens 127 collects light from the light valve 50. After the light from the light valve 50 passes through the zoom lens 100 to reach the screen at the magnified, a magnified image larger than the light valve 50 or an image having a size equal to that of the light valve 50 may be formed on the screen.

In this embodiment, each of the first lens 112, the second lens 114, the third lens 116, the fourth lens 118, the fifth lens 121, the sixth lens 122, the seventh lens 123, the eighth lens 124, the ninth lens 125, the tenth lens 126, and the eleventh lens 127 is a spherical lens, for example.

In this embodiment, the second lens group 120 is capable of being moved with respect to the reduced side for zooming, and the first lens group 110 is capable of being moved with respect to the reduced side for focusing. For example, when the second lens group 120 is moved away from the first lens group 110, the magnification of the zoom lens 100 is increased. When the magnification is increased to the maximum, the zoom lens 100 is at the wide end as shown in FIG. 1A. When the second lens group 120 is moved toward the first lens group 110, the magnification of the zoom lens 100 is decreased. When the magnification is decreased to the minimum, the zoom lens 100 is at the tele end as shown in FIG. 1B. In this embodiment, the zoom lens 100 at the wide end has a magnification of 1.2, and the zoom lens 100 at the tele end has a magnification of 1. After the zoom lens 100 zooms or when the distance between the first lens 112 and the screen at the magnified side is changed, the first lens group 110 may be moved with respect to the second lens group 120 for focusing, which makes the image on the screen clear.

In the zoom lens 100 of this embodiment, two lens groups and eleven lenses are used, which effectively reduces the number of the lenses and the mechanisms in the zoom lens 100, so as to reduce the cost of the zoom lens 100 and reduce the difficulty in fabricating lenses and assembling lenses. Moreover, the lenses in the zoom lens 100 are all spherical lenses, which further reduce the difficulty in fabrication and assembly.

To achieve better optical property, the zoom lens 100 in an embodiment may be designed to satisfy at least one of the following conditions:

$$0.742877 < |F2/F1| < 0.873451 \quad (1);$$

$$1.259217 < |F1/Fw| < 1.731266 \quad (2);$$

$$0.909656 < |F2/Fw| < 1.434265 \quad (3);$$

where F1 is the effective focal length of the first lens group 110, F2 is the effective focal length of the second lens group 120, and Fw is the effective focal length of the zoom lens 100. In this embodiment, the zoom lens 100 satisfies all of the above conditions (1), (2), and (3), to which the scope of the invention is, however, not intended to be limited.

One embodiment of the zoom lens 100 is described hereinafter. It should be noted that data listed in following tables 1 and 2 is not intended to limit the invention. Appropriate modifications to parameters or settings of the zoom lens 100 without departing from the scope or spirit of the invention would be made by those skilled in the art upon reading the description herein, and they should be included in the scope of the invention.

TABLE 1

| Surface | Radius of Curvature (millimeter) | Distance (millimeter) | Refractive Index | Abbe Number | Remarks |
|---|---|---|---|---|---|
| S1 | 43.617 | 4.24 | 1.7 | 55.5 | First Lens |
| S2 | 66.249 | 0.1 | | | |
| S3 | 38.023 | 1.91 | 1.71 | 53.9 | Second Lens |
| S4 | 16.385 | 9.3 | | | |
| S5 | −60 | 1.7 | 1.71 | 53.9 | Third Lens |
| S6 | 27.51 | 5.14 | | | |
| S7 | 33.491 | 4.74 | 1.81 | 25.4 | Fourth Lens |
| S8 | 272.665 | D8(Variable) | | | |
| S9 | Infinity | 5.66 | 1.58 | 59.4 | Fifth Lens |
| S10 | −22.855 | 1.58 | 1.81 | 25.4 | Sixth Lens |
| S11 | −47.324 | 0.1 | | | |
| S12 | 53.314 | 3.05 | 1.85 | 23.8 | Seventh Lens |
| S13 | Infinity | 0.1 | | | |

TABLE 1-continued

| Surface | Radius of Curvature (millimeter) | Distance (millimeter) | Refractive Index | Abbe Number | Remarks |
|---|---|---|---|---|---|
| S14 | 19.868 | 4.28 | 1.85 | 23.8 | Eighth Lens |
| S15 | 11.65 | 8.83 | 1.6 | 60.6 | Ninth Lens |
| S16 | −19.307 | 1.55 | 1.65 | 33.8 | Tenth Lens |
| S17 | 15.273 | 3.43 | | | |
| S18 | Infinity | 0.91 | | | Aperture Stop |
| S19 | 50.018 | 6.59 | 1.83 | 37.2 | Eleventh Lens |
| S20 | −43.678 | D20(Variable) | | | |
| S21 | Infinity | 3 | 1.49 | 70.4 | Cover Glass |
| S22 | Infinity | 0.48 | | | |

In Table 1, distance represents the linear distance along the optical axis A of the zoom lens 100 between two adjacent surfaces. For example, the distance of surface S1 represents the linear distance along the optical axis A between the surface S1 and the surface S2. Thickness, refractive index, and Abbe number of each lens in the remarks column correspond to the values of distance, refractive index, and Abbe number in a corresponding row. In addition, in Table 1, the surfaces S1 and S2 are two surfaces of the first lens 112. The surfaces S3 and S4 are two surfaces of the second lens 114. The surfaces S5 and S6 are two surfaces of the third lens 116. The surfaces S7 and S8 are two surfaces of the fourth lens 118. The surface S9 is a surface of the fifth lens 121 facing the magnified side. The surface S10 is a surface connecting the fifth lens 121 and the sixth lens 122. The surface S11 is a surface of the sixth lens 122 facing the reduced side. The surfaces S12 and S13 are two surfaces of the seventh lens 123. The surface S14 is a surface of the eighth lens 124 facing the magnified side. The surface S15 is a surface connecting the eighth lens 124 and the ninth lens 125. The surface S16 is a surface connecting the ninth lens 125 and the tenth lens 126. The surface S17 is a surface of the tenth lens 126 facing the reduced side. The surface S18 is the aperture stop 140. The surfaces S19 and S20 are two surfaces of the eleventh lens 127. The surfaces S21 and S22 are two surfaces of a cover glass 60. The cover glass 60 is used for protecting the light valve 50. The distance in the row corresponding to the surface S22 represents the distance between the surface S22 and the light valve 50.

Settings, such as, radius of curvature and distance of each surface, have been shown in Table 1 and therefore are not repeated herein. Moreover, D8 and D20 in Table 1 are each a variable. When the zoom lens 100 is at the wide end, D8 is 11.19, and D20 is 21.5. When the zoom lens 100 is at the tele end, D8 is 3.05, and D20 is 25.

Figure 2A:
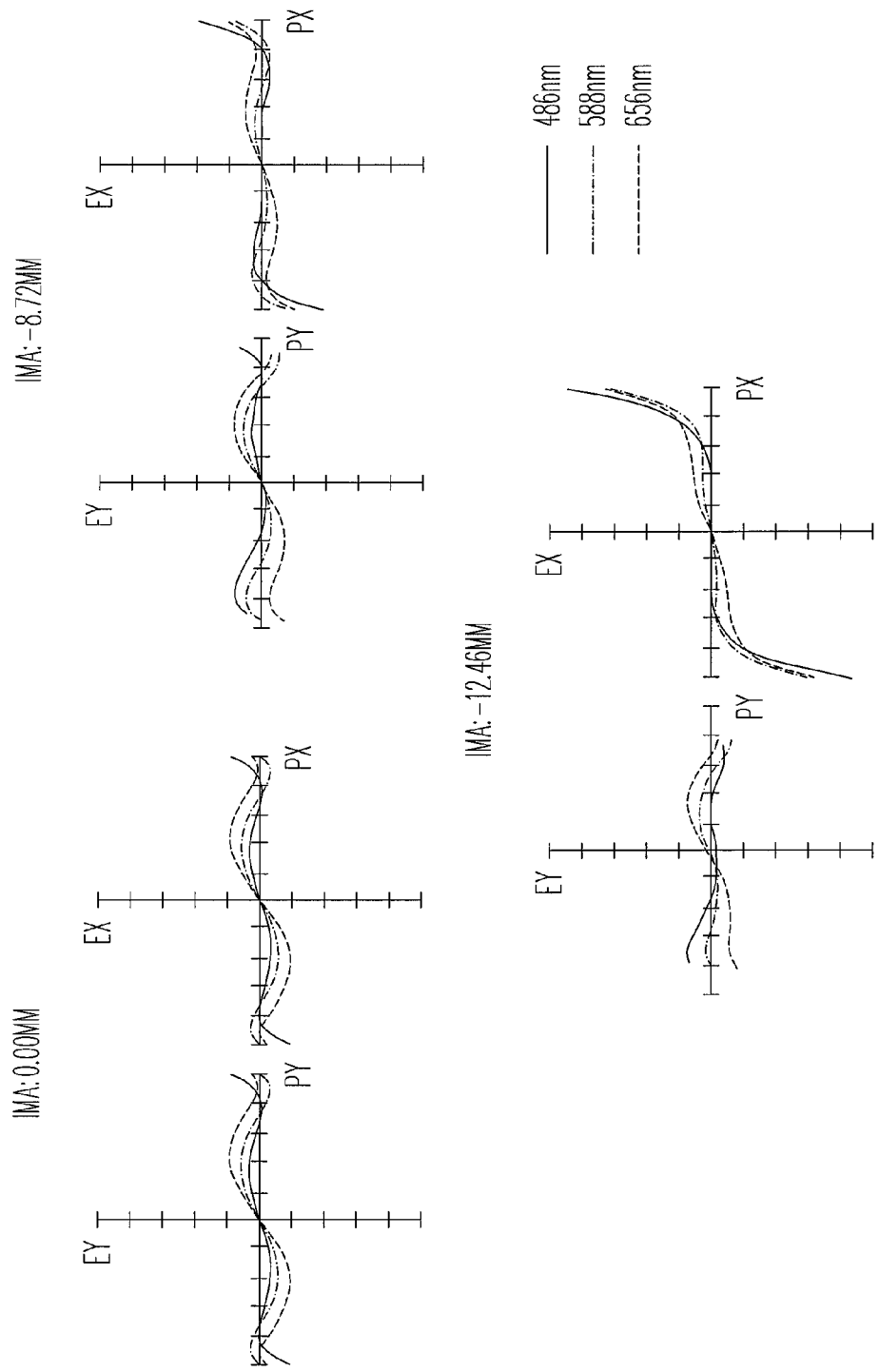
FIGS. 2A through 2D are diagrams showing optical simulation data regarding imaging of the zoom lens of FIGS. 1A and 1B.
Figure 2B:
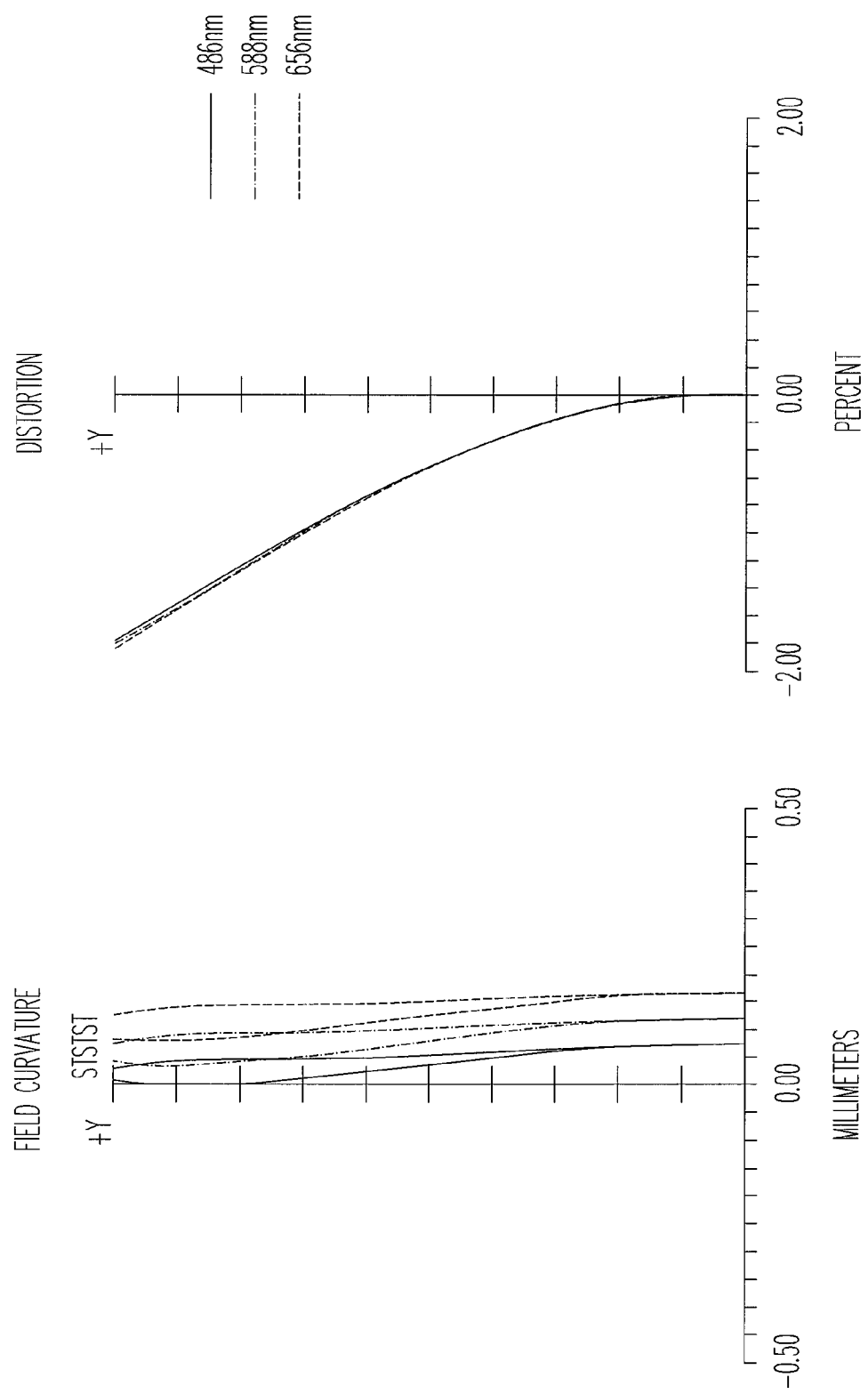
Figure 2C:
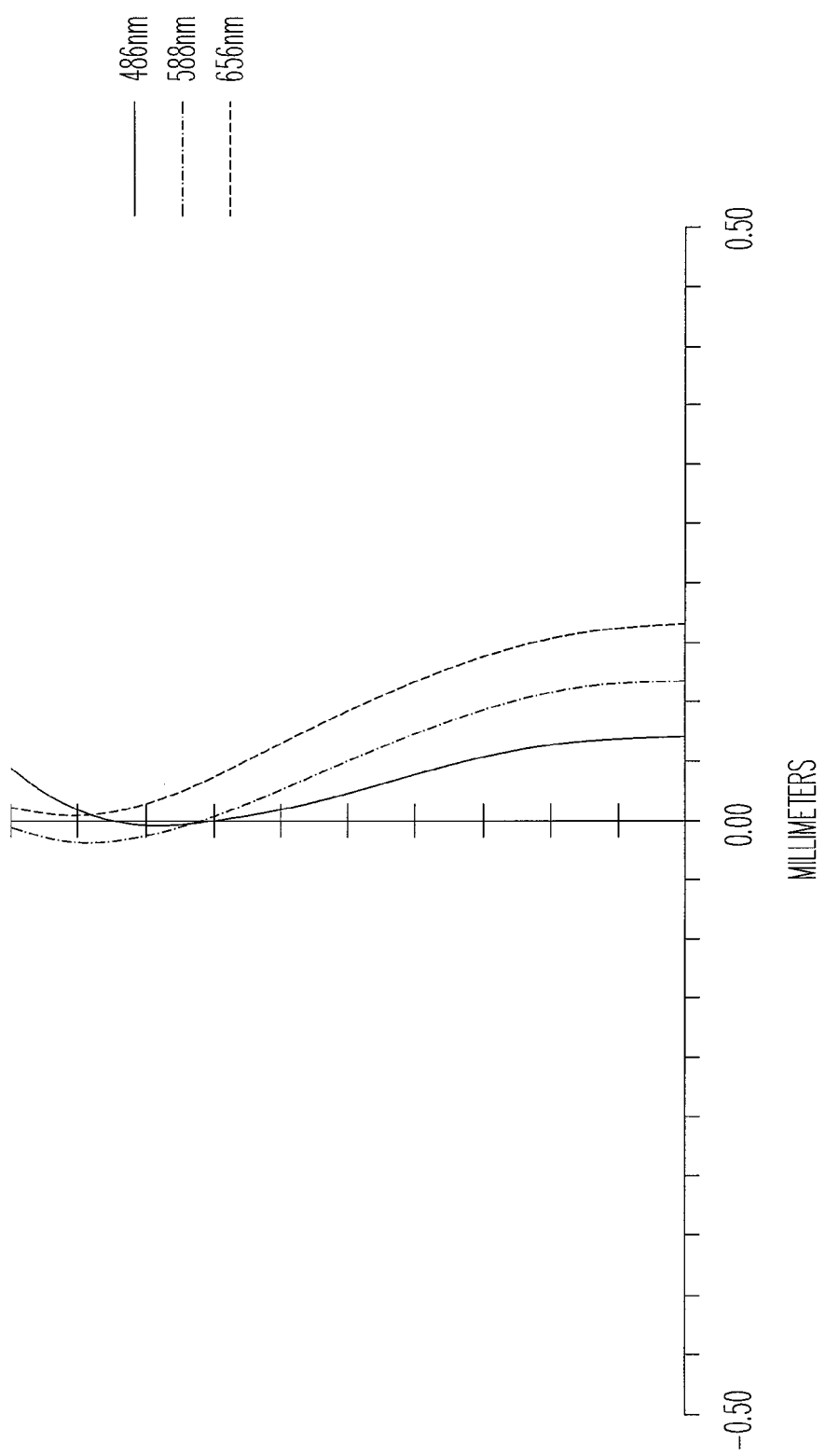
Figure 2D:
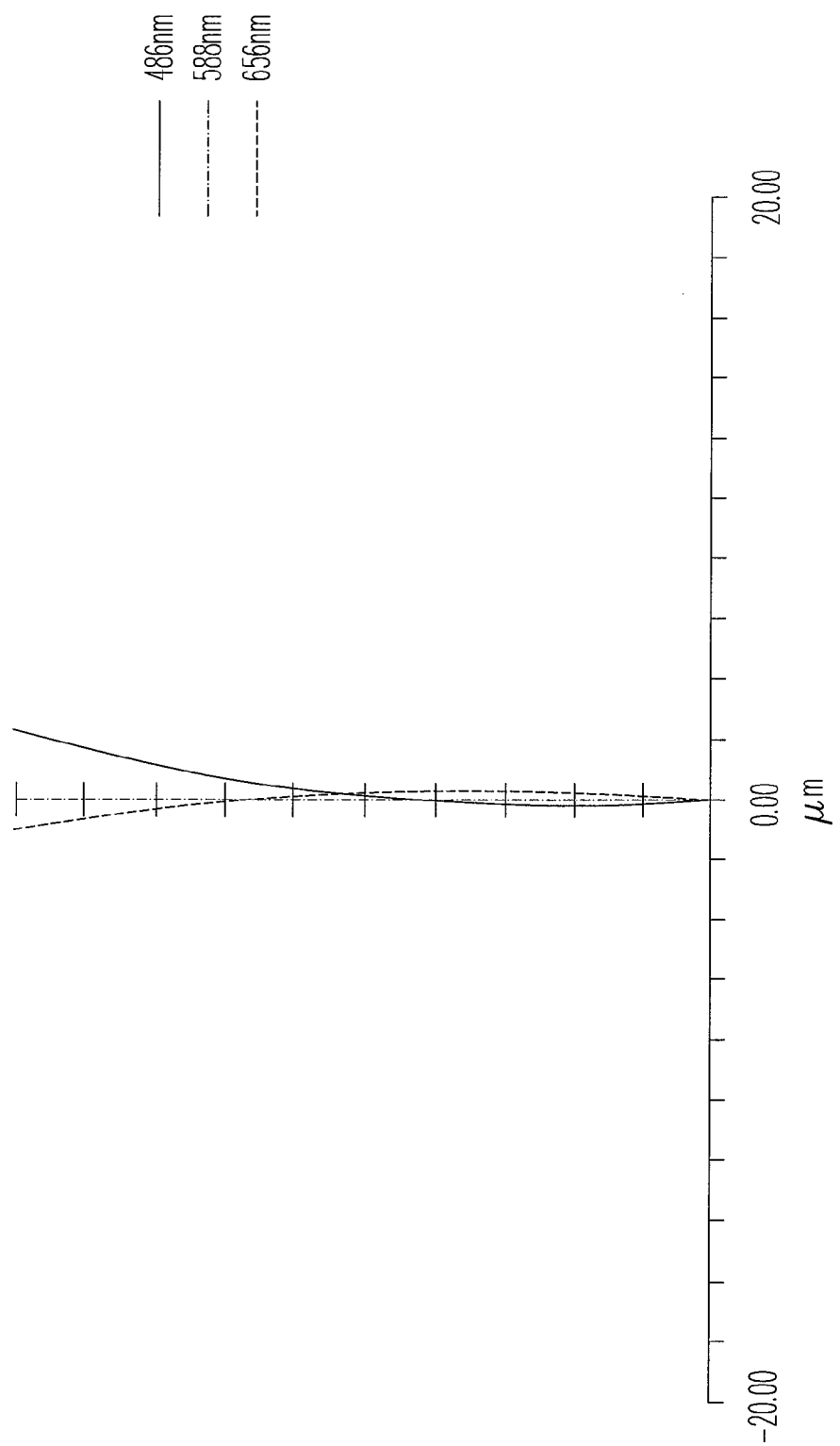

FIGS. 2A through 2D are diagrams showing optical simulation data regarding imaging of the zoom lens of FIGS. 1A and 1B. FIG. 2A is a transverse ray fan plot simulated for lights respectively having wavelengths of 486, 588, and 656 nanometers, wherein the scales of each of the vertical axes and the horizontal axes are from −50 microns to +50 microns. FIG. 2B shows in sequence from left to right a field curvature diagram and a distortion diagram simulated for lights respectively having wavelengths of 486, 588, and 656 nanometers. The horizontal axis of the field curvature diagram represents the distance from the focal plane, and horizontal axis of the distortion diagram represents the distortion. The vertical axis of each of the field curvature diagram and the distortion diagram represents the field from 0 to the maximum. The unit of the field is changed to a field angle, and the maximum field is 29.342 degrees. FIG. 2C shows the longitudinal aberration simulated for lights respectively having wavelengths of 486, 588, and 656 nanometers, wherein the horizontal axis represents the distance from the focal plane of no color aberration, and the vertical axis represents the field from 0 to the maximum. FIG. 2D shows the lateral color simulated for lights respectively having wavelengths of 486, 588, and 656 nanometers, wherein the horizontal axis represents the distance from wavelength of 587.5 nanometers, and the vertical axis represents the field from 0 to the maximum. All the plots showing in FIGS. 2A through 2D are within the standard ranges. Thus, the fixed-focus lens 100 of this embodiment maintains a good imaging quality while completely using spherical lenses and having less lens groups.

In conclusion, the embodiment or the embodiments of the invention may have at least one of the following advantages, in the zoom lens according to the embodiment of the invention, two lens groups and eleven lenses are used, which effectively reduces the number of the lenses and the mechanisms in the zoom lens, so as to reduce the cost of the zoom lens and reduce the difficulty in fabricating lenses and assembling lenses. Moreover, since the lenses in the zoom lens according to the embodiment of the invention are all spherical lenses, which further reduces the difficulty in fabrication and assembly.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A zoom lens adapted to be disposed between a magnified side and a reduced side, the zoom lens comprising:

a first lens group disposed between the magnified side and the reduced side and having a negative refractive power, the first lens group comprising a first lens, a second lens, a third lens, and a fourth lens arranged in sequence from the magnified side toward the reduced side, wherein refractive powers of the first lens, the second lens, the third lens, and the fourth lens are respectively positive, negative, negative, and positive; and a second lens group disposed between the first lens group and the reduced side and having a positive refractive power, the second lens group comprising a fifth lens, a sixth lens, a seventh lens, an eighth lens, a ninth lens, a tenth lens, and an eleventh lens arranged in sequence from the magnified side toward the reduced side, wherein refractive powers of the fifth lens, the sixth lens, the seventh lens, the eighth lens, the ninth lens, the tenth lens, and the eleventh lens are respectively positive, negative, positive, negative, positive, negative, and positive, and wherein the eighth lens, the ninth lens, and the tenth lens together form a triple cemented lens.

2. The zoom lens according to claim 1, wherein the fifth lens and the sixth lens together form a double cemented lens.

3. The zoom lens according to claim 1, wherein the zoom lens satisfies $0.742877<|F2/F1|<0.873451$, $1.259217<|F1/Fw|<1.731266$, and $0.9096561<|F2/Fw|<1.434265$, where F1 is the effective focal length of the first lens group, F2 is the effective focal length of the second lens group, and Fw is the effective focal length of the zoom lens.

4. The zoom lens according to claim 1 further comprising an aperture stop disposed between the tenth lens and the eleventh lens.

5. The zoom lens according to claim 1, wherein the first lens is a concave-convex lens with a convex surface facing the magnified side, the second lens is a convex-concave lens with a convex surface facing the magnified side, the third lens is a biconcave lens, and the fourth lens is a concave-convex lens with a convex surface facing the magnified side.

6. The zoom lens according to claim 1, wherein the fifth lens is a plane-convex lens with a plane surface facing the magnified side, the sixth lens is a convex-concave lens with a concave surface facing the magnified side, the seventh lens is a plane-convex lens with a convex surface facing the magnified side, the eighth lens is a convex-concave lens with a convex surface facing the magnified side, the ninth lens is a biconvex lens, the tenth lens is a biconcave lens, and the eleventh lens is a biconvex lens.

7. The zoom lens according to claim 1, wherein the second lens group is capable of being moved with respect to the reduced side for zooming, and the first lens group is capable of being moved with respect to the reduced side for focusing.

8. The zoom lens according to claim 1, wherein each of the first lens, the second lens, the third lens, the fourth lens, the fifth lens, the sixth lens, the seventh lens, the eighth lens, the ninth lens, the tenth lens, and the eleventh lens is a spherical lens.

* * * * *